No. 737,277. PATENTED AUG. 25, 1903.
T. F. ROWLAND.
CORRUGATOR.
APPLICATION FILED MAY 6, 1902.
NO MODEL. 7 SHEETS—SHEET 1.

Witnesses:

Inventor:
Thomas F Rowland
By
Frederick S Duncan
Att'y.

No. 737,277. PATENTED AUG. 25, 1903.
T. F. ROWLAND.
CORRUGATOR.
APPLICATION FILED MAY 6, 1902.

NO MODEL. 7 SHEETS—SHEET 3.

Witnesses: Inventor:
Thomas F. Rowland
By
Frederick S. Duncan
Att'y

No. 737,277. PATENTED AUG. 25, 1903.
T. F. ROWLAND.
CORRUGATOR.
APPLICATION FILED MAY 6, 1902.
NO MODEL. 7 SHEETS—SHEET 4.

Witnesses:
Inventor:
Thomas F. Rowland
by
Frederick S. Duncan
Att'y.

No. 737,277. PATENTED AUG. 25, 1903.
T. F. ROWLAND.
CORRUGATOR.
APPLICATION FILED MAY 6, 1902.
NO MODEL. 7 SHEETS—SHEET 5.

Witnesses:
Inventor:
Thomas F Rowland
By
Frederick S Ormean
Att'y.

No. 737,277. PATENTED AUG. 25, 1903.
T. F. ROWLAND.
CORRUGATOR.
APPLICATION FILED MAY 6, 1902.
NO MODEL. 7 SHEETS—SHEET 6.
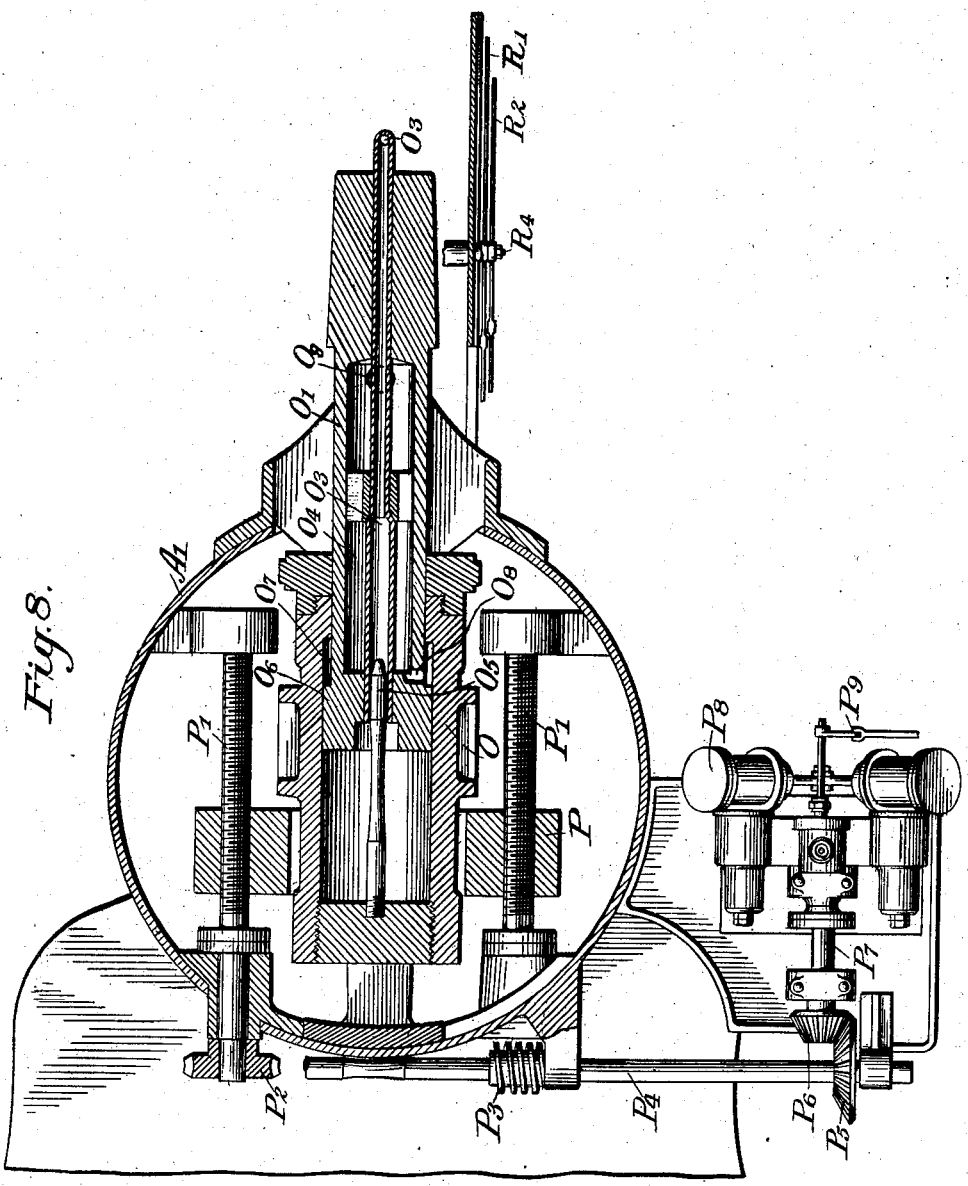

No. 737,277. PATENTED AUG. 25, 1903.
T. F. ROWLAND.
CORRUGATOR.
APPLICATION FILED MAY 6, 1902.
NO MODEL. 7 SHEETS—SHEET 7.
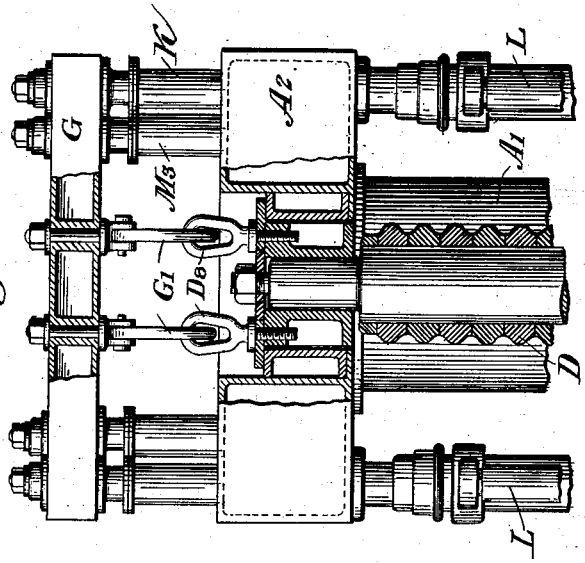
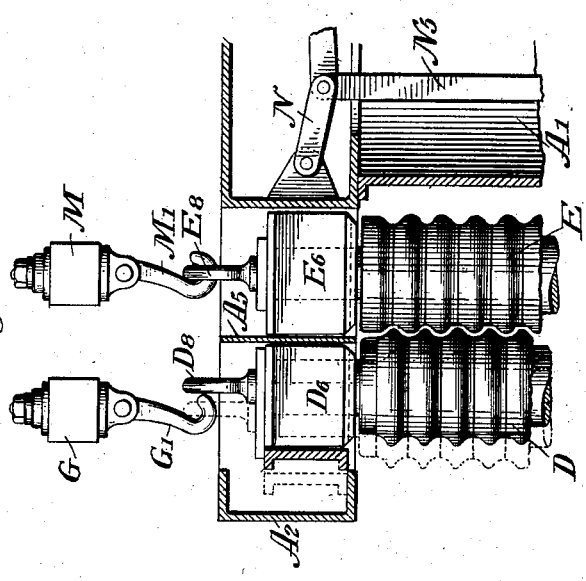

No. 737,277. Patented August 25, 1903.

UNITED STATES PATENT OFFICE.

THOMAS F. ROWLAND, OF NEW YORK, N. Y.

CORRUGATOR.

SPECIFICATION forming part of Letters Patent No. 737,277, dated August 25, 1903.

Application filed May 6, 1902. Serial No. 106,137. (No model.)

*To all whom it may concern:*

Be it known that I, THOMAS F. ROWLAND, a citizen of the United States, and a resident of New York, in the county and State of New York, have invented certain new and useful Improvements in Corrugators, of which the following is a specification, taken in connection with the accompanying drawings, which form a part of the same.

This invention relates to corrugators which are especially adapted to form transverse corrugations in metal tubes and relates to the same class of corrugators shown in the patent to Rowland and Hill, No. 379,985, March 27, 1888, and in the patent to Rowland, No. 412,121, October 1, 1889.

Figure 1:
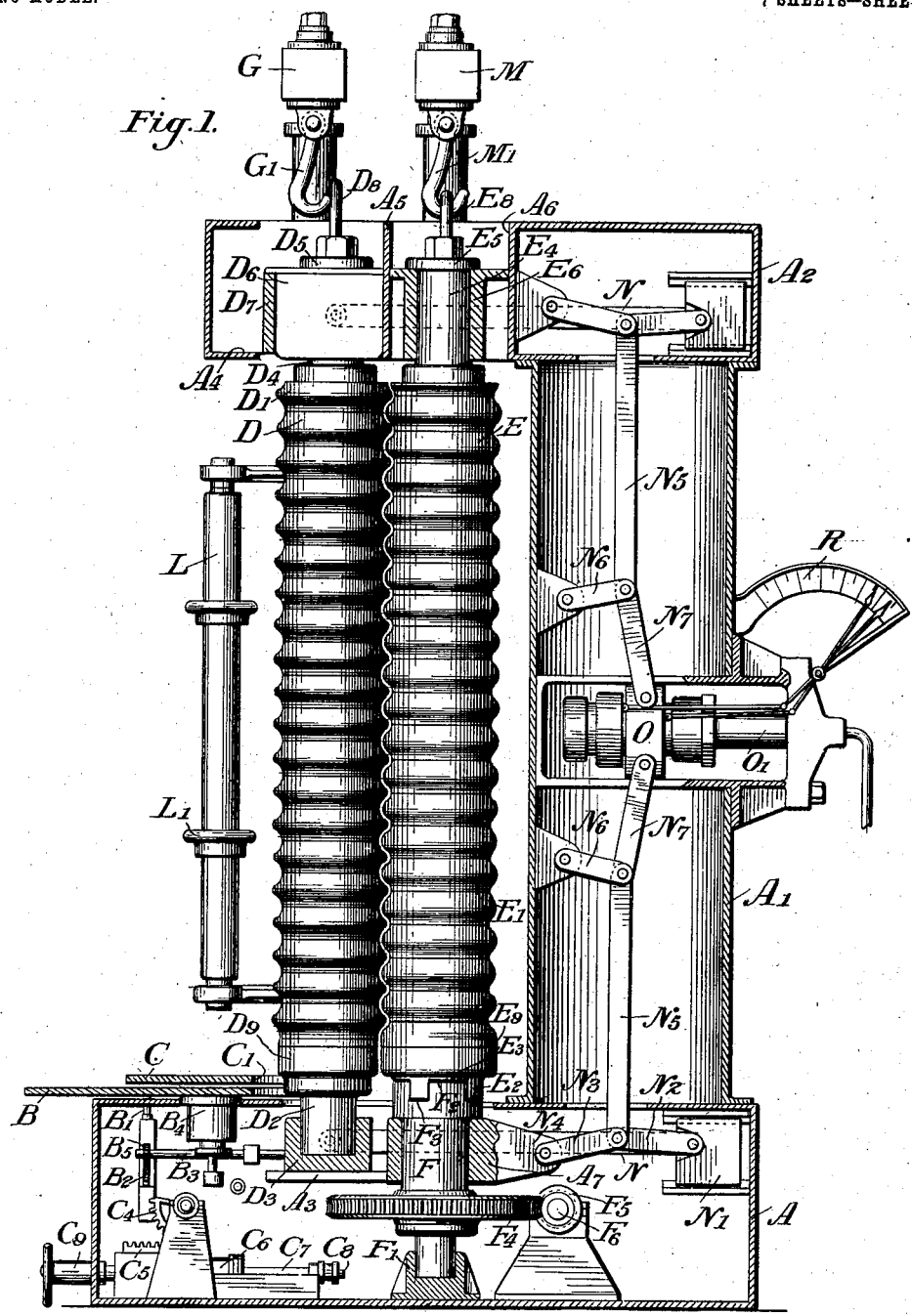
Figure 2:
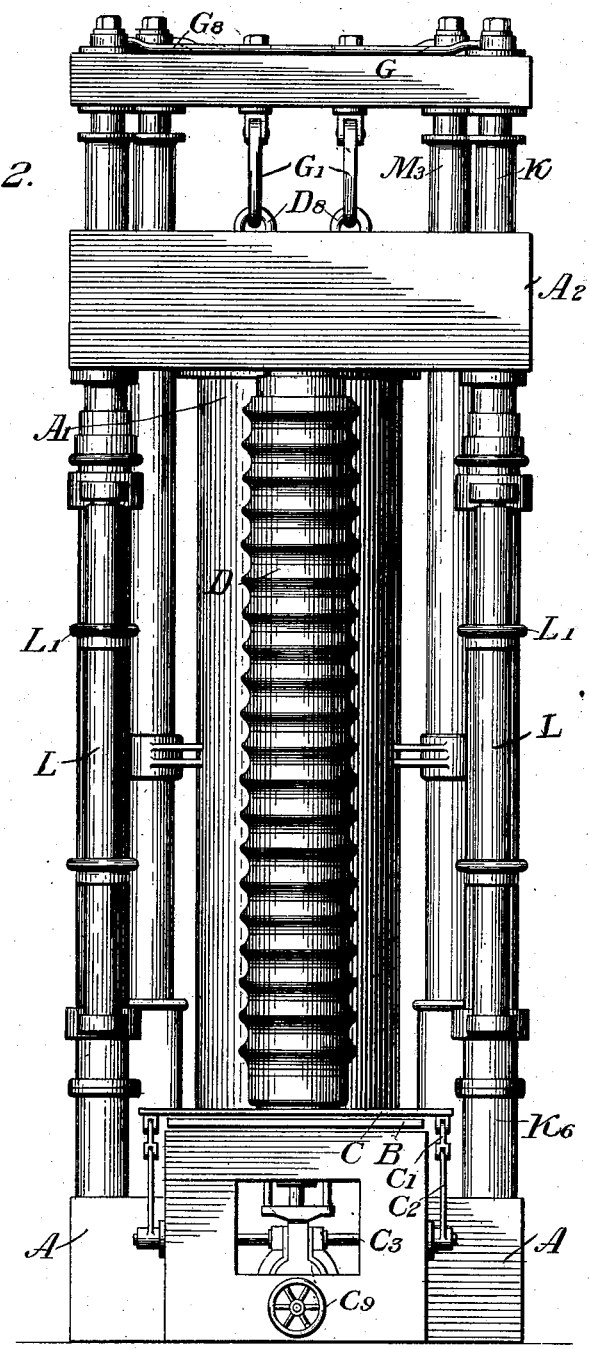
Figure 3:
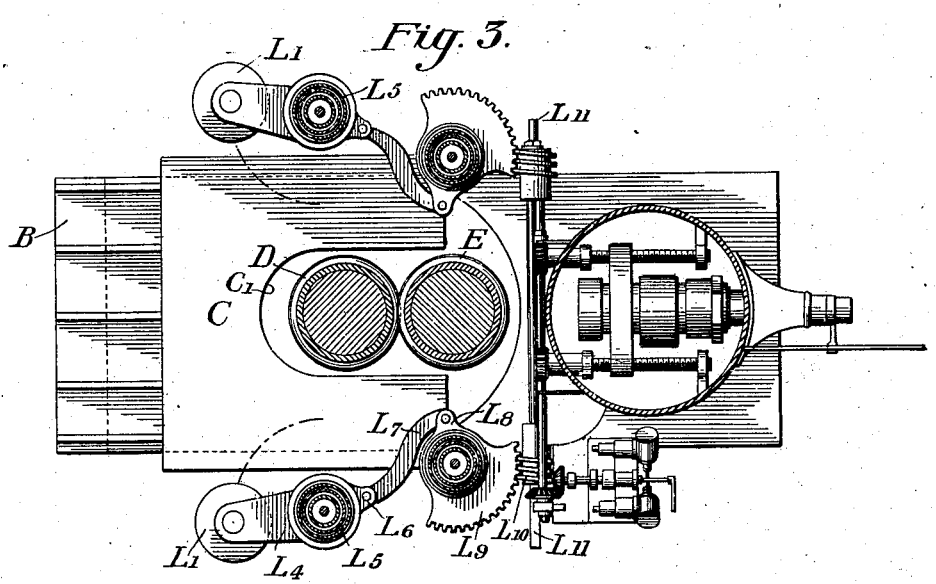
Figure 4:
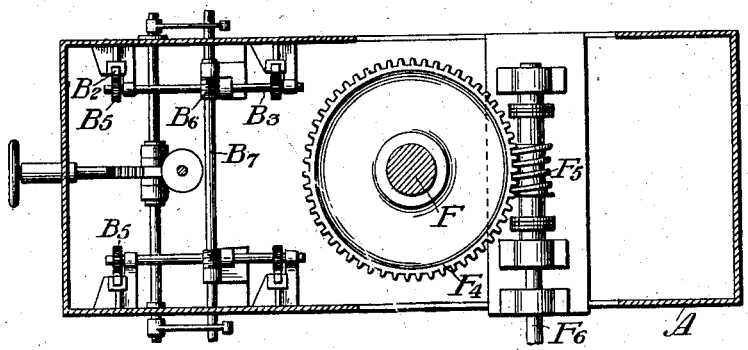
Figure 6:
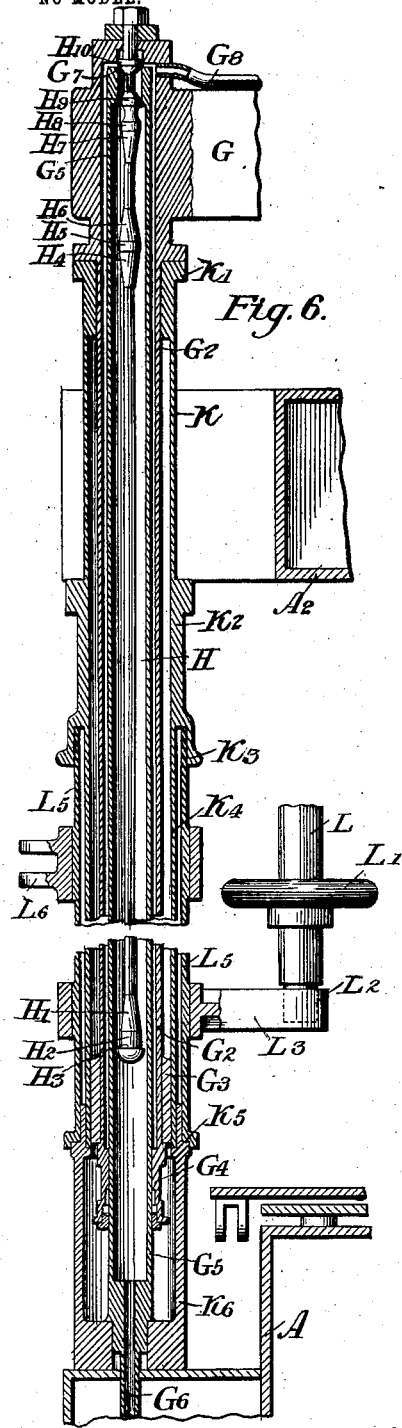
Figure 5:
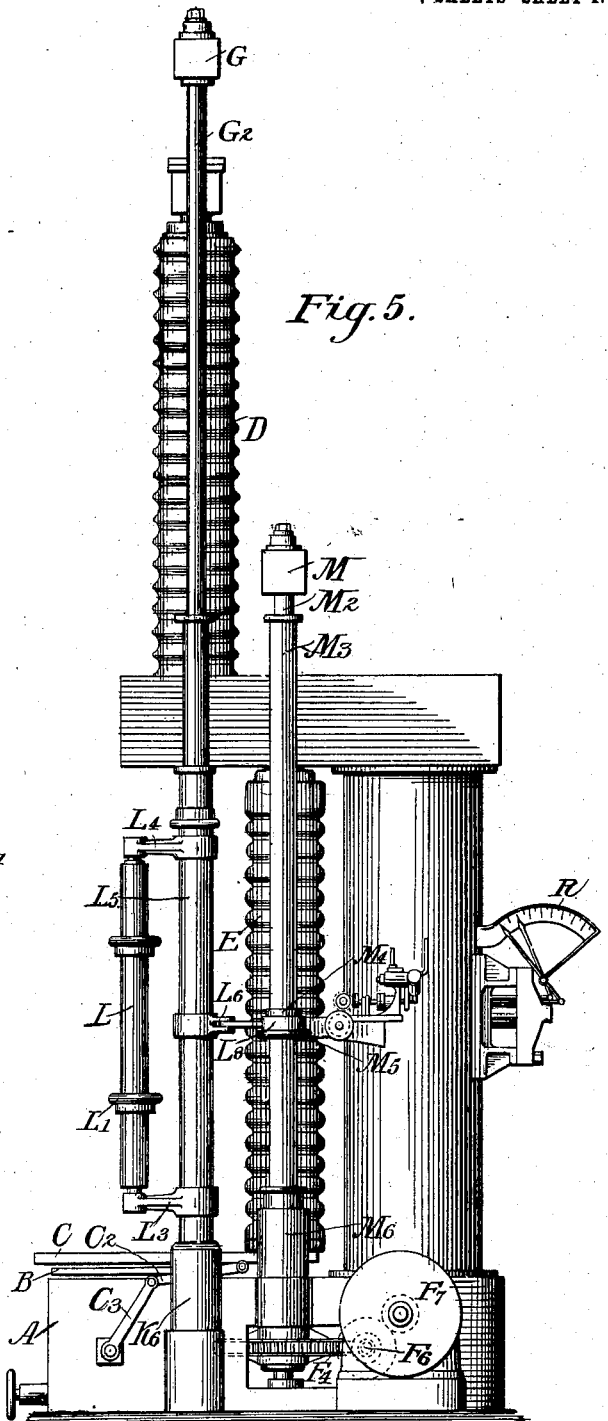
Figure 7:
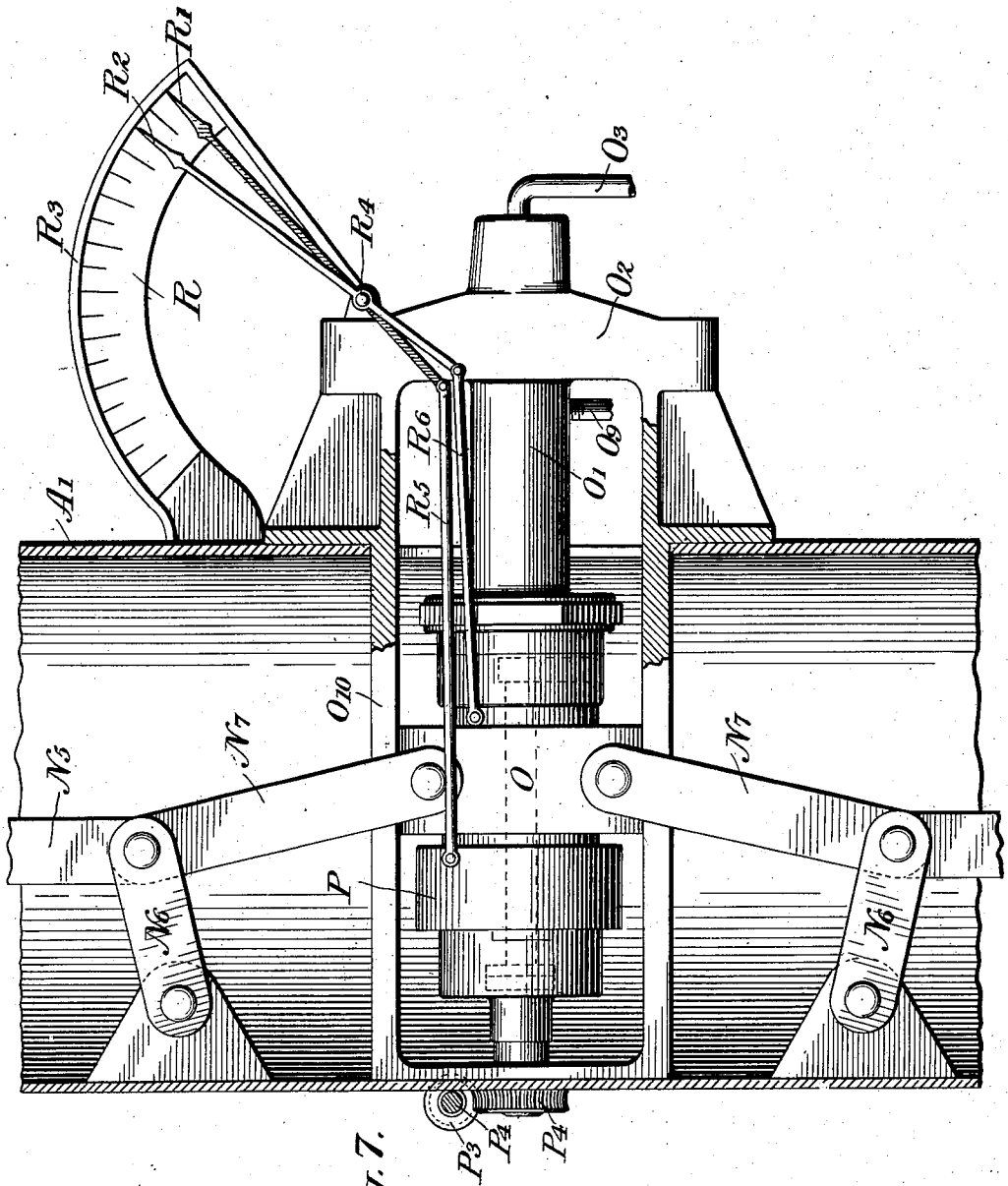

In the accompanying drawings, in which the same reference characters refer to similar parts in the several figures, Figure 1 is a vertical sectional view through a corrugator embodying this invention, parts being shown in elevation. Fig. 2 is a front elevation of the same. Fig. 3 is a horizontal sectional view taken through the rolls and column. Fig. 4 is a similar view taken through the base of the machine. Fig. 5 is a side elevation, the traverse-roll being shown in elevated position. Fig. 6 is a vertical sectional view showing the lift mechanism for lifting the rolls. Fig. 7 is a vertical sectional view showing the traverse mechanism. Fig. 8 is a corresponding horizontal sectional view. Figs. 9 and 10 are detail sectional views.

The positively-rotated driving-roll is mounted in a vertical position in the frame of the corrugator, and the traverse-roll coöperates with it to form transverse corrugations in a cylindrical blank. The traverse mechanism, which comprises a hydraulic cylinder and toggle connections, operates to move the traverse-roll in a parallel manner toward the driving-roll with gradually-increasing power. In order to raise either of the rolls, lift mechanism is arranged on either side of the machine, which comprises a lift-beam to engage the roll and suitable lift-cylinders secured to the ends of the beam which operate through hydraulic power to lift the roll in a regular manner. The table upon which the work rests is mounted to slide upon the platform, and this platform is moved vertically during the operation of the machine to keep the table in engagement with the work.

The frame of the corrugator comprises a heavy base A, to which is rigidly secured the pillar $A'$ at the rear of the machine. The entablature $A^2$ is secured to the top of the pillar, so that the whole frame forms a rigid support for the operating parts of the machine. The traverse-roll D and the driving-roll E are mounted in this frame in a vertical position, as is indicated in Fig. 1. The driving-roll, which is preferably formed with blunt annular corrugations $E'$, extending around the same, is supported at its upper end in the roll journal-box $E^6$. This box is formed with a suitable bearing, in which the journal $E^4$ of the roll operates. The head $E^5$ of the roll holds the journal in the box, so that both may be raised together when desired, the journal-box moving in the vertical channel formed by the plates $A^5$ $A^6$ in the head. The lower end of the driving-roll is provided with a flat portion $E^9$ and also with lugs $E^2$ and depressions $E^3$ to form an interlocking clutch in connection with similar lugs and projections $F^2$ $F^3$ on the upper end of the roll-shaft F. This roll-shaft is supported in heavy bearings $F'$ and $A^7$, secured to the base, and is operated by the worm-gear $F^4$. The worm $F^5$ on the worm-shaft $F^6$ engages this worm-wheel and is driven through a suitable reduction-gear from the motor $F^7$. By this means the driving-roll is rotated with great power and with comparatively slow speed and is rigidly supported in a vertical position.

The traverse-roll D is formed with the coöperating corrugations $D'$, which, as are indicated, are relatively sharp and with the flat or cylindrical portion $D^9$ at its lower end. The working face of these corrugating-rolls is preferably composed of a series of rings, (indicated in Fig. 10,) which are slipped over the central spindle forming the body of the roll and rigidly secured thereto in any desired manner. Since these rings are readily removable and may be easily replaced by others of any desired shape, the size and shape of the corrugations may be readily altered. Furthermore, the cylindrical portions $D^9$ $E^9$ (shown at the bottom of the corrugating-rolls in Fig. 1) may be altered as desired, so as to form cylindrical flanges of any desired extent on the ends of the corrugated cylindrical blanks. The journal $D^2$ at the lower end of the traverse-roll rests in the roll journal-box $D^3$, which is mounted to reciprocate in suitable guideways $A^3$ in the base. The journal $D^4$ at the upper end of the traverse-roll engages the bearing-sleeve $D^6$, the collar $D^5$ on the upper end of the journal serving to hold the roll in the sleeve. This bearing-sleeve fits within the reciprocating roll journal-box $D^7$, which moves on suitable guides $A^4$ in the head. The two boxes $D^3$ and $D^7$, which support the two ends of the traverse-roll, are pivoted to the traverse-bars N, which are connected at their rear ends to the traverse-blocks N', these blocks being mounted to reciprocate in suitable guideways in the base and entablature, respectively. These two traverse-blocks may be simultaneously reciprocated by any desired traverse mechanism, so as to move the traverse-roll in a parallel manner with respect to the guide-roll. The lower traverse-block is pivoted to the link $N^2$, forming, in connection with the link $N^3$, a toggle-joint between the traverse-block and the stationary bearing $N^4$. These two links are operated by the way-bar $N^5$, which is pivoted at its upper end to the toggle-link $N^7$, which is connected to the traverse-cylinder O and which is pivoted to the distance-piece $N^6$, which has a pivot-bearing in the pillar. The upper traverse-block is operated by a similar linkage from the traverse-cylinder O.

As is seen by reference to Figs. 7 and 8, the traverse-cylinder O is mounted to reciprocate upon the differential piston O', the cylinder being supported by the guides $O^{10}$, secured to the pillar. A traverse-pipe $O^3$ enters the piston through the outer end of the same, where it is supported from the pillar and is formed with the enlarged valve-seat (indicated in Fig. 8) near its central portion. The traverse-valve $O^5$, which is secured to the cylinder, engages this seat so as to throttle the passage of fluid through the traverse-pipe when the traverse-cylinder has moved rearward to the full extent of its stroke. The release-pipe $O^9$ communicates with the passage $O^4$ within the piston and allows fluid to enter the annular cylinder $O^7$ through the passage $O^8$, so as to drive the traverse-cylinder rearward. It is of course understood that suitable packing of any desired nature may be employed in this hydraulic mechanism to assist in making tight joints between the various parts, and, furthermore, it is evident that it is not necessary to employ this exact form of traverse mechanism, since the linkage may be operated by any desired means. The forward movement of the traverse-cylinder O is limited by the stop P, which surrounds the cylinder, as indicated in Fig. 8. This stop is engaged by the stop-screws P' on either side of the cylinder, and by this means it is moved along the cylinder and firmly held in any desired position. The screws are provided at their forward ends with the worm-wheels $P^2$, which are engaged by the worms $P^3$ on the shaft $P^4$. This shaft is driven through the beveled gears $P^5$ $P^6$ from the axle $P^7$ of the stop-motor $P^8$, the motor being operated in either direction by the controller $P^9$, so that by this means the stop may be moved into any desired position. The stop P is connected by the link $R^5$ with the stop-needle R', pivoted about the point $R^4$, and the traverse-needle $R^2$ is similarly connected with the traverse-cylinder O by the link $R^6$. These needles coöperate with the dial R, removably supported in a suitable frame $R^3$. It will be seen that through the toggle connections the forward movement of the traverse-cylinder moves the traverse-roll D in a parallel manner toward the driving-roll E, and assuming that fluid is admitted through the traverse-pipe $O^3$ the movement of the traverse-cylinder will continue until this cylinder engages the stop P. The traverse-roll may be released by admitting fluid through the release-pipe $O^9$, so that it will act upon the rear end of the differential piston to move the traverse-cylinder in a rearward direction, the traverse-valve operating to limit this rearward movement. The position of the traverse-roll at any time is indicated by the traverse-needle $R^2$, and the position of the stop P is similarly indicated by the stop-needle. The distance between the two needles indicates the distance through which the traverse-roll may move before the traverse-cylinder engages the stop which limits its movement.

The traverse-roll D may be lifted during the operation of the corrugator into the elevated position. (Shown in Fig. 5.) The lift mechanism which accomplishes this consists, essentially, of two lift-cylinders $G^2$, arranged on either side of the traverse-roll and rigidly connected to the lift-beam G. This lift-beam is provided with the lift-hooks G', which engages the rings $D^8$ when the traverse-roll is moved forward into the release position. (Shown in dotted lines in Fig. 9.) The columns K are secured in a vertical position on either side of the traverse-roll by being rigidly secured to the base A and to the entablature $A^2$, as is indicated in Fig. 6. Each of these columns is formed with the collar K' at its upper end, which engages the lift-cylinder $G^2$, so as to guide it during its vertical movement. The lower end of this lift-cylinder is provided with the flange $G^3$, which engages the smooth bore of the column and in this manner guides the lower end of the lift-cylinder. In this manner the vertical movement of the lift-cylinder in the column is limited, since the flange cannot pass the collar. The lower end of the lift-cylinder is formed at $G^4$ to closely engage the lift-ram $G^5$, suitable packing being provided at this point, if desired. Fluid is admitted to the lower end of the lift-ram, which, as is indicated, is formed hollow and passes out of the upper end of this ram, the seat G$^7$ being formed at this point to cooperate with the valve H, which is rigidly secured to the lift beam and cylinder. The lift-cylinder and ram secured to the opposite side of the lift-beam G are formed in a similar manner, and the two lift-cylinders are connected at their upper ends by the equalizer-pipe G$^8$, which maintains an equal pressure of liquid in the two cylinders at all times. In operating this lift mechanism fluid is simultaneously admitted through the two lift-pipes G$^6$. This serves to slowly raise the lift cylinders and beam, the cut-off flange H$^{10}$ being first raised from the seat G$^7$ and allowing the fluid to enter the cylinders. The movement of the cylinders and beam is slow until the throttling-rings H$^8$ and H$^9$ have passed through the seat. This period of the lift corresponds with the engagement of the lift-hooks with the rings. The rate of upward movement is gradually increased as the conical portion H$^7$ of the valve passes through the seat and is then once more reduced by the conical portion H$^6$ of the valve until when the throttling-ring H$^5$ enters the seat the upward movement is slow. This corresponds to the time when the bearing-sleeve D$^6$ moves clear of the roll-box. The upward movement increases at this point as the conical portion H$^4$ of the valve comes into action, and then the movement is very rapid until the traverse-roll is slowly brought to rest at its extreme upward position through the tapering portion H$'$ of the valve, the throttling-ring H$^2$, and the cut-off H$^3$, which engages the seat and prevents further passage of fluid. It will be understood, of course, that instead of this form of valve and seat to regulate the movements of the lift mechanism other devices may be employed. It will be seen that as the roll is lowered by allowing the fluid to escape from the lift-pipes G$^6$ the retardation of the roll occurs at the same points in its downward movement, the roll descending rapidly until the bearing-sleeve enters the box, and then the roll is gradually lowered into engagement with the box at its lower end. The lift-beam is thereafter allowed to move clear of the rings, so that the hooks disengage the rings. The equalizer-pipe operates during the movement of the lift mechanism to maintain the fluid-pressure in the two cylinders equal under all conditions, and the two cylinders are therefore always maintained under the same vertical pressure, so that they operate smoothly, and the cramping and strain of the parts is thereby prevented. It is of course understood that before the traverse-roll is lifted it is always released from engagement with the driving-roll by being moved forward to the fullest extent by the traverse-gear into the dotted position indicated in Fig. 9. The rings under these conditions come into proper engagement with the lift-hooks. In operating the corrugator, therefore, the journal-boxes of the traverse-roll must always be moved into release position before this roll is lifted, and they must be maintained in this position until the traverse-roll is once more lowered into engagement with them. It is of course understood that the driving-roll is provided with similar lift mechanism, the lift-beam M being connected in a similar way to the two lift-cylinders M$^2$, which move within the columns M$^3$. By this means the driving-roll may be raised through the opening in the head for replacing or repairing the same.

Guide-rolls L are provided on either side of the traverse-roll to maintain the cylindrical blank in proper position with respect to the rolls while it is being corrugated. These guide-rolls L, as is seen in Fig. 6, are provided with suitable rings or projections L$'$, and the journals L$^2$ of these rolls are revolubly mounted in the arms L$^3$ L$^4$, which are rigidly secured to the sleeves L$^5$. Each one of these sleeves L$^5$ engages the flange K$^5$ on the column K$^6$, and the upper end of the sleeve is supported by the inclosing collar K$^8$. These guide-rolls are moved in unison about the columns through the mechanism indicated in Fig. 3, the arms and sleeves being rotated by the links L$^7$, which are connected to the pivots L$^6$ and which are also connected to the segments L$^8$. The gears L$^9$ on these segments are engaged by the worms L$^{10}$ on the guide-shaft L$^{11}$, so that when this shaft is rotated by any desired means the guide-rolls are moved over the table C and are maintained at all times symmetrical with respect to the driving and traverse rolls. As is seen in Fig. 5, the segments L$^8$ are mounted on the columns M$^3$, moving about the bearings M$^4$ on these columns and supported by the flanges M$^5$.

The base of the machine supports the vertically-movable platform B. (Shown in Fig. 1.) The hydraulic platform-cylinder B$^4$, constructed and operated in a well-known manner, may be employed, if desired, to compensate in whole or in part for the weight of the platform and parts supported thereby during the operation of the corrugator. This platform is mounted upon a series of posts B$'$, to which the racks B$^2$ are secured, these posts being guided to move vertically. As is seen in Fig. 4, the pinions B$^5$, secured to the shafts B$^3$, engage the racks B$^2$ and operate them in unison, since the elevating-shaft B$^7$ has worm-and-gear connections with both the shafts B$^3$. In this manner the elevating-shaft simultaneously moves all of the posts vertically, so that the platform B is raised and lowered, as desired, while at the same time it is maintained in horizontal position. As is shown in Figs. 1 and 5, the table C is mounted to reciprocate upon the platform, so as to slide toward and from the corrugating-rolls, the opening C$'$ being formed in the table to accommodate these rolls. The links C$^2$ on either side of the table serve to connect it with the table-levers C³, which are both secured upon the shaft indicated. The gear-segment C⁴ on this shaft meshes with the rack C⁵ on the table-cylinder C⁶. This cylinder engages the differential piston C⁷ and is operated through hydraulic power, the fluid being admitted through the pipe C⁸. The table-gage C⁹ is mounted in the base of the machine and is adjustable, so as to limit the inward movement of the table as desired, since the position of this gage limits the forward movement of the table-cylinder.

In operating this corrugator the traverse-roll is raised through the lift mechanism into the position indicated in Fig. 5, and the table C is moved forward to its extreme position by the table-cylinder. A cylindrical blank heated to the desired extent is then placed upon the table. The table is moved inward, carrying the blank with it into engagement with the driving-roll, and thereupon the traverse-roll is lowered inside the blank into engagement with its boxes. The driving-roll is then rotated through the mechanism described, and the traverse-roll is moved backward until it engages the blank and forms cylindrical corrugations in it as it is rotated by the driving-roll. The guide-rolls are moved into engagement with the blank, so as to maintain it in proper position on the table and to insure its regular rotation as it is fed around by the corrugating-rolls. It is desirable to move the traverse-roll back, so as to gradually deepen the corrugations in the blank, and to accomplish this the stop is gradually moved by the stop-motor P⁸, so as to prevent any sudden movement of the traverse-roll that might be caused by the hydraulic traverse-gear, and yet the force which moves the traverse-roll is supplied by the hydraulic means shown, which serves to equalize to a greater extent the strain upon the various parts. The traverse-needle and stop-needle serve to indicate in a very desirable manner the depth of the corrugations and the extent through which the traverse-roll is free to move before the stop is engaged by the traverse-cylinder, and by employing a series of dials the graduations upon them may be made to correspond with the depth of corrugations in cylindrical blanks of varying thickness. As the corrugations are formed in the cylindrical blank the blank becomes shorter, and the table should always be moved up, so as to support the lower edge of the blank to the desired extent. This assists in preventing the irregular movement of the blank through the corrugating-rolls, which would give a spiral course to the corrugations and cause the blank to turn spirally. If this irregular movement should commence at any time, the traverse-roll should at once be released, and this may be accomplished very quickly by the traverse-gear, since fluid is at once admitted to the release-pipe and the differential piston very quickly releases the traverse-roll from engagement with the blank. The blank then drops out of engagement with the corrugating-rolls, so that its lower edge engages the table, and the traverse-roll is then gradually brought into engagement with the blank while the latter is supported by the table. In this way any tendency of the blank to turn spirally as the corrugations are being formed is corrected. It will be seen that under these conditions the stop may be maintained in position and the traverse-roll may be very quickly brought up to the position which it occupied before it was released from the blank, after which the regular and gradual movement of the traverse-roll to deepen the corrugations again takes place. Since the driving-roll E is formed with blunter corrugations than the freely-moving traverse-roll, it has less tendency to abrade the surface of the corrugated cylinder than when the driving-roll is formed with the sharper corrugations. When the corrugations have attained their desired depth, the driving-roll is stopped, the traverse-roll is released and raised by the lift mechanism, and the corrugated cylinder thereupon withdrawn on the table.

It will of course be understood that many modifications may be made in this device by those familiar with this art without departing from the spirit of my invention. Furthermore, parts of this invention may be employed without using all of the same, and certain elements and portions of this device may be employed in connection with other devices. I do not, therefore, wish to be limited to the disclosure which I have made in this case; but

What I claim as new, and what I wish to secure by Letters Patent, is set forth in the appended claims.

1. In a corrugator, a frame, a corrugated driving-roll, means to rotate said roll, a corrugated traverse-roll revolubly mounted in movable boxes, traverse mechanism to traverse said traverse-roll with respect to said driving-roll, said traverse mechanism comprising a traverse-cylinder, a differential hydraulic piston coöperating with said cylinder, toggle connections between said cylinder and said boxes, a movable stop to engage said traverse-cylinder to limit the movement of said traverse-roll toward said driving-roll; lift mechanism for said driving-roll and said traverse-roll, said lift mechanism comprising lift-cylinders and rams on either side of said rolls connected to lift-beams, equalizer-pipes connecting said lift-cylinders on either end of said beams, seats and valves provided with throttling-rings to regulate the movement of said lift mechanism; a platform, means to vertically move said platform and to maintain the same in horizontal position, a sliding table mounted on said platform and means to slide said table to carry a blank into engagement with said rolls.

2. In a corrugator, a frame, a rotary driving-roll in said frame, a rotary traverse-roll in said frame to coöperate with said driving-roll, said traverse-roll being mounted with movable boxes and traverse-gear to move said traverse-roll with respect to said driving-roll, said traverse-gear comprising a hydraulic cylinder, a differential piston to coöperate with said cylinder and toggle connections between said cylinder and said traverse-roll to move said roll in a parallel manner and with gradually-increasing power toward said driving-roll.

3. In a corrugator, a frame, rotary corrugated rolls in said frame, one of said rolls being mounted in movable boxes to traverse with respect to the other roll and traverse-gear to traverse said roll, said traverse-gear comprising traverse-blocks, traverse-bars connecting said boxes and said traverse-blocks, toggle-joints between said blocks and said frame, a traverse cylinder and piston and a toggle connection to operate said toggle-joints from said cylinder and piston.

4. In a corrugator, a frame, rolls revolubly mounted in said frame, one of said rolls being mounted in movable boxes to traverse with respect to the other roll, traverse-gear to traverse said roll comprising toggle-joints to move said boxes, and operating means having a toggle connection with said toggle-joints to traverse said roll in a parallel manner and with gradually-increasing power toward the other roll.

5. In a corrugator, corrugating-rolls and control-gear to traverse one of said rolls, said control-gear comprising a traverse-cylinder, a differential piston to coöperate with said cylinder under fluid-pressure, a movable stop to engage said cylinder, means to adjust the position of said stop and a traverse-needle and stop-needle connected to said cylinder and stop and coöperating with a single dial.

6. In a control-gear, a traverse-cylinder, a differential piston to coöperate with said cylinder, a movable stop to engage said cylinder, means to adjust the position of said stop, and a traverse-needle and a stop-needle connected to said cylinder and said stop to coöperate with a single dial.

7. In control-gear, a traverse element, means to operate said traverse element, a stop to engage said traverse element, means to adjust the position of said stop, a traverse-needle and a stop-needle connected to said traverse element and said stop to indicate the relative position of said traverse element and said stop.

8. In a corrugator, a frame, vertical rotary corrugating-rolls, one of said rolls being vertically movable to pass inside a cylindrical blank, means to move said roll vertically and a movable support mounted on said frame and coöperating with said rolls to receive a vertical cylindrical blank in its outward position and to carry the same inward to allow said vertically-movable roll to enter said blank.

9. In a corrugator, vertical movable corrugating-rolls and lift mechanism to raise one of said rolls, said lift mechanism comprising a lift-beam, cylinders secured to either end of said beam, columns to engage and guide said cylinders, rams to coöperate with said cylinders, said rams being formed with seats, valves having throttling-rings thereon secured to said cylinders to coöperate with said seats to regulate the movement of said cylinders and an equalizer-pipe between said cylinders.

10. In a corrugator, vertical rotary corrugating-rolls and lift mechanism to raise one of said rolls, said lift mechanism comprising a lift-beam, hydraulic elements at either end of said beam comprising cylinders and rams, one of said elements being secured to either end of said beam, hydraulic means to operate said elements and an equalizer connecting the cylinders on either side of said beam.

11. In a corrugator, a frame, rotary corrugating-rolls vertically mounted in said frame, lift mechanism to lift one of said rolls, said lift mechanism comprising columns on either side of said roll, said columns being provided with collars at the upper ends of the same, a lift-beam to engage said roll, lift-cylinders fitting said collars and guided thereby, said lift-cylinders being provided with flanges at their lower ends to guide the same, lift-rams engaging said cylinders, means to admit fluid to said rams, seats in the upper ends of said rams, valves having throttling-rings thereon connected to said cylinders to coöperate with said seats and an equalizer-pipe connected to said cylinders.

12. In a corrugator, vertical movable corrugating-rolls, lift mechanism to elevate one of said rolls, said lift mechanism comprising columns on either side of said roll, hydraulic elements connected to either end of a beam to engage said roll, said elements being guided by said columns, sleeves rotatably mounted on said columns, guide-rolls secured to said sleeves and means to simultaneously move said guide-rolls to engage a blank.

13. In a corrugator, a frame, rotary corrugating-rolls mounted in said frame, one of said rolls being movable to pass inside a cylindrical blank and a movable support mounted on said frame and coöperating with said rolls to receive a cylindrical blank in its outward position and to carry the same inward to allow said movable roll to enter said blank.

14. In a corrugator, a frame, a positively-operated driving-roll having blunt corrugations to engage the outside of a cylindrical blank, a coöperating roll having sharp corrugations to engage the inside of said blank and means to traverse one of said rolls with respect to the other.

15. In a corrugator, a positively-operated driving-roll having blunt corrugations, a coöperating traverse-roll having sharp corrugations and means to traverse said traverse-roll.

16. In a corrugator, vertical rotary corrugating-rolls, lift mechanism to raise one of said rolls to allow a blank to pass under the same and to lower said roll within said blank, a sliding horizontal table and means to operate said table to move a blank under said roll.

17. In a corrugator, a frame, rotary corrugating-rolls mounted in said frame, and traverse-gear to move one of said rolls with respect to the other, said traverse-gear comprising fluid means to move said roll with regulated force and a movable stop to positively limit the movement of said roll.

18. In a corrugator, vertical rotary corrugating-rolls, a vertically-movable platform, and a table slidingly mounted on said platform to support a cylindrical blank.

19. In a corrugator, vertical rotary corrugating-rolls, means to rotate one of said rolls, lift mechanism to vertically raise one of said rolls, a sliding horizontal table, means to slide said table horizontally so that said table receives a vertical cylindrical blank in its outward position and carries the same bodily under the raised corrugating-roll.

20. In a corrugator, vertical rotary corrugating-rolls, one of said rolls being vertically movable to pass inside a cylindrical blank, means to move said roll vertically and a horizontal sliding table coöperating with said rolls to receive a vertical cylindrical blank in its outward position and to carry the same inward to allow said vertically-movable roll to enter said blank.

21. In a corrugator, vertical corrugated driving and traverse rolls, means to rotate said driving-roll, means to traverse said traverse-roll with respect to said driving roll and lift mechanism operating to engage said traverse-roll when it is traversed into released position away from said driving-roll to elevate the same, said lift mechanism being disengaged from said traverse-roll except when said traverse-roll is in released position.

THOMAS F. ROWLAND.

Witnesses:
WILLIAM W. WEST,
JANE E. SMITH.